United States Patent

[11] 3,613,013

[72] Inventor Lucio M. Vallese
    Glen Ridge, N.J.
[21] Appl. No. 600,694
[22] Filed Dec. 7, 1966
[45] Patented Oct. 12, 1971
[73] Assignee International Telephone and Telegraph Corporation

[54] MEMORY SYSTEM
    10 Claims, 5 Drawing Figs.
[52] U.S. Cl. .................................................. 328/34,
    325/324, 328/113, 340/173 R
[51] Int. Cl. ...................................................... G11c 13/00
[50] Field of Search .......................................... 325/322,
    324, 334, 452, 453, 454, 462, 469, 320 X; 328/34,
    58, 60, 61, 113, 223; 333/6, 83; 343/205, 263,
    200; 340/171 A, 206; 179/15.55

[56] References Cited
UNITED STATES PATENTS
2,509,218 5/1950 DeLoraine .................... 328/113 X Primary Examiner—Rodney D. Bennett, Jr.
Assistant Examiner—Daniel C. Kaufman
Attorneys—C. Cornell Remsen, Jr, Rayson P. Morris, Percy P. Lantzy, Philip M. Bolton and Isidore Togut ABSTRACT: A radiofrequency pulse memory system is described. There is provided a plurality of cavity resonators each resonant at a different frequency to detect a radiofrequency (RF) pulse having a frequency equal to the resonant frequency of the detecting resonator. A plurality of RF signals are locally generated each having a frequency equal to the frequency of the detected pulses. An arrangement responds to a detected pulse to provide at the system output an RF signal having a frequency equal to the frequency of the detected pulse for a variable period of time greater than the period of time of the detected pulse.

INVENTOR.
LUCIO M. VALLESE
BY Alfred C. Hill
AGENT

MEMORY SYSTEM

This invention relates to memory or storage systems and more particularly to a radiofrequency (RF) pulse memory system.

RF pulse memory systems, to which the present invention relates, operate on the principle or receiving an input pulse of given width and providing at the output thereof a pulse whose width is stretched to have a width much greater than the width of the input pulse. Conceivable the output pulse could have a width approaching infinity thereby providing substantially infinite memory or storage of the frequency of the input RF pulse.

One commonly employed RF memory system employs reiterative techniques, such as reentrant delay line loops. In this system, the incoming pulse is delayed, amplified and repeated until the desired stretched RF pulse is obtained.

An object of this invention is to provide an RF memory system employing techniques other than the reiterative techniques.

Another object of this invention is to provide an RF memory system employing spectral generator techniques operative throughout the RF frequency range including the microwave frequency range.

A feature of this invention is the provision of an RF memory system comprising a source of radiofrequency pulses having their frequency disposed within a given frequency band, first means to detect the frequency of each of said pulses, second means to generate a plurality of radiofrequency signals each having a different frequency corresponding to one of the detected frequencies, and third means responsive to the detected frequencies to control the length of time the generated signals having frequencies equal to the detected frequencies are present at the output of the system.

Another feature of this invention is the provision of a mixer and local oscillator to down convert the input RF signals to a lower frequency range and a second used in conjunction with the local oscillator to up convert the frequency produced by the memory system to a frequency range corresponding to the frequency range of the input RF signal.

Still another feature of this invention is the provision of an input waveguide having disposed therealong a plurality of resonant cavities. When one of the resonant cavities is shock excited by an RF pulse having a frequency equal to a resonant frequency of one of the cavities, a rectifier coupled to the shock excited cavity produces an output which turns on a monostable multivibrator having circuit components therein which render the period of time of being tuned on variable. The monostable multivibrator triggers an oscillator having a frequency equal to the resonant frequency of the shock excited cavity for application to the output of the system for a period of time determined by "on" time of the monostable multivibrator.

A further feature of this invention is the provision of an AND gate and timing generator which produces a variable width output timing signal operative in conjunction with the above arrangement to sample the output of the oscillator to thereby control, either along or in cooperation with the monostable multivibrator, the length of time the signal of the oscillator is available at the output of the system.

Still a further feature of this invention is the provision of a plurality of resonant cavities disposed along an input waveguide one of which is shock excited when the frequency of the input pulse equals the resonant frequency of this one cavity. Inserted in the resonant cavity is a tunnel diode having bias means coupled thereto with a variable time constant so that the resonant cavity and the tunnel diode behave as an oscillator of the negative resistance type. When the cavity is shock excited oscillation takes place with the variable time constant of the bias means maintaining the oscillations at the output of the system for the desired length of time.

Another feature of this invention is the incorporation with the above-mentioned variable time constant biased oscillator, a cooperating AND gate and variable width timing signal to sample the oscillatory output of the oscillator for application to the output of the system, the variable time constant bias arrangement and/or the AND gate cooperating to provide the desired memory.

Still a further feature of this invention is the provision of an oscillator which is modulated to provide for circulation in a first waveguide a plurality of frequencies corresponding to resonant frequencies of resonant cavities which are coupled to an input waveguide. When one of the resonant cavities is shock excited by an input RF pulse having a frequency equal to its resonant frequency, a flip-flop circuit is activated and has its output applied to an AND gate which in turn is controlled by a variable width timing signal to activate a radio frequency switch for the desired length of time, said radiofrequency switch coupling the appropriate signal from the first waveguide through the resonant cavity to the second waveguide and, hence, to the output of the memory system.

The above-mentioned and other features and objects of this invention will become more apparent by reference to the following description taken in conjunction with the accompanying drawings, in which.

For purposes of explanation only, it will be assumed that an incoming RF pulse within the frequency range of 8.4 kilomegacycle to 9.6 kilomegacycle has a duration of at least 0.5 microseconds and is to be stretched to an output pulse having the same frequency as the input pulse within 10 milliseconds of the arrival of the input pulse to a desired width up to 100 milliseconds.

Figure 1:
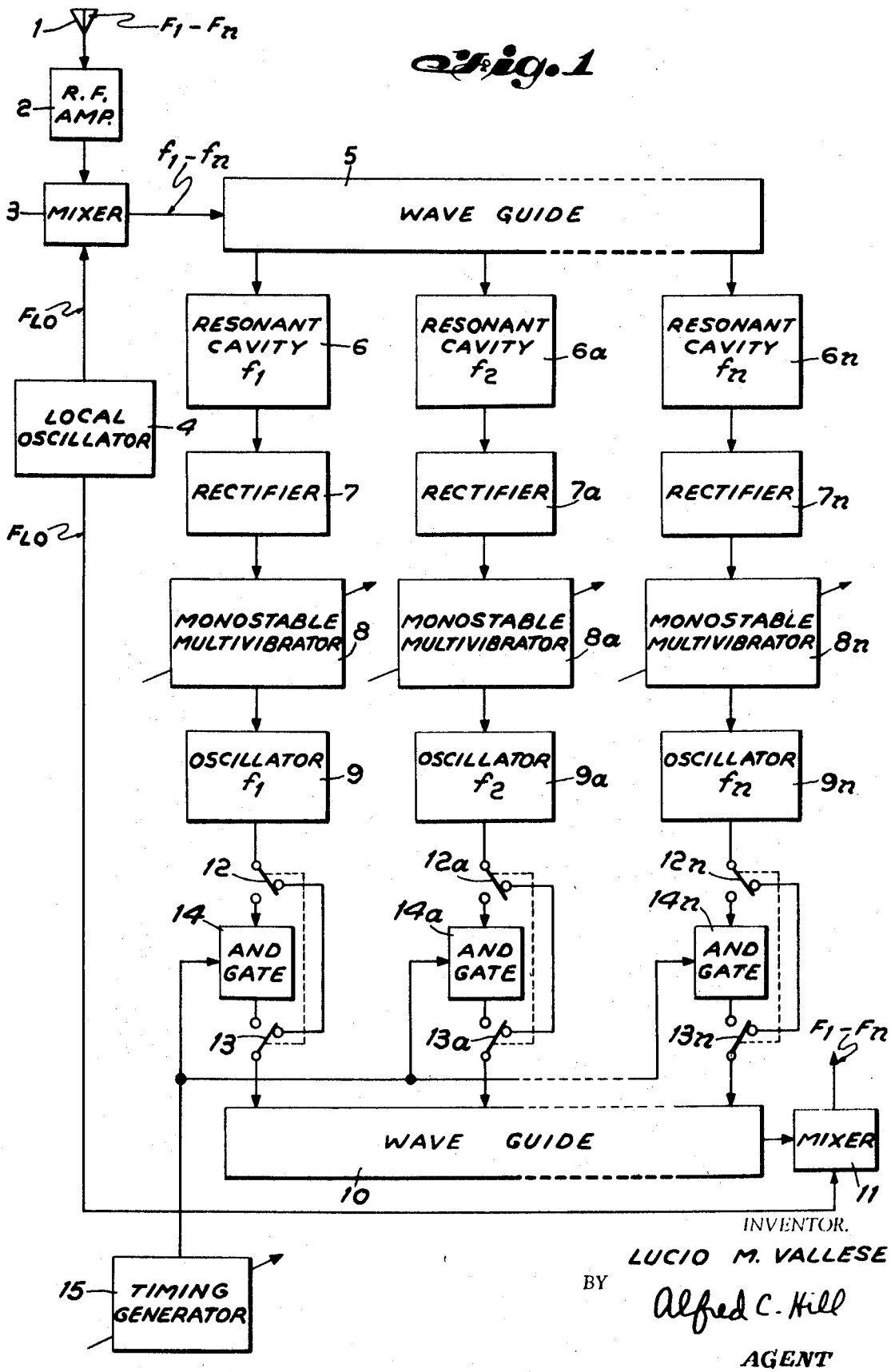
FIG. 1 is a block diagram of one embodiment of a memory system in accordance with the principles of this invention.

Referring to FIG. 1, the incoming RF pulse is detected by antenna 1 and applied to RF amplifier 2. The output therefrom is coupled to mixer 3 which in cooperation with local oscillator 4 will down convert the frequency of the incoming pulse into a frequency range of, for instance, 2,000 megacycles to 3,200 megacycles. The output of mixer 3 is coupled to input waveguide 5 which has disposed therealong a plurality of resonant cavities 6 whose resonant frequencies are spaced 1 megacycle apart. When an RF pulse is present in waveguide 5 corresponding to the resonant frequency of one of resonant cavities 6 this cavity is shock excited. Rectifier 7 disposed in cavities 6 respond to the shock excitation of cavity 6 to produce an output which is coupled to an associated one of monostable multivibrators 8 for activation thereof to its unstable condition. The length of time this multivibrator will stay in its unstable condition is variable. The output pulse from multivibrator 8 places in operation an associated one of oscillators 9 having the same frequency as the RF pulse which shock excited the associated cavity 6. The output of oscillators 9 is coupled to output waveguide 10 and, hence, to mixer 11 which in cooperation with local oscillator 4 up converts the oscillator signal to the original frequency range of the input pulse. The length of time that the RF signal having a frequency corresponding to the frequency of the original RF pulse is present at the output of mixer 11 is determined by the associated multivibrator 8.

Alternatively, multivibrator 8 could be adjusted to provide its unstable output for 100 milliseconds thereby rendering the associated oscillator 9 operative for this length of time. With switches 12 and 13 being disposed in their other position. The appropriate one of AND gates 14 is connected to the output of its associated oscillator. The conduction of AND gate is adjusted by varying the width of the timing signal from timing generator 15 and determines the actual length of time that the oscillatory output of the appropriate one of oscillators 9 is available at the output of the system (output of mixer 11).

Figure 2:
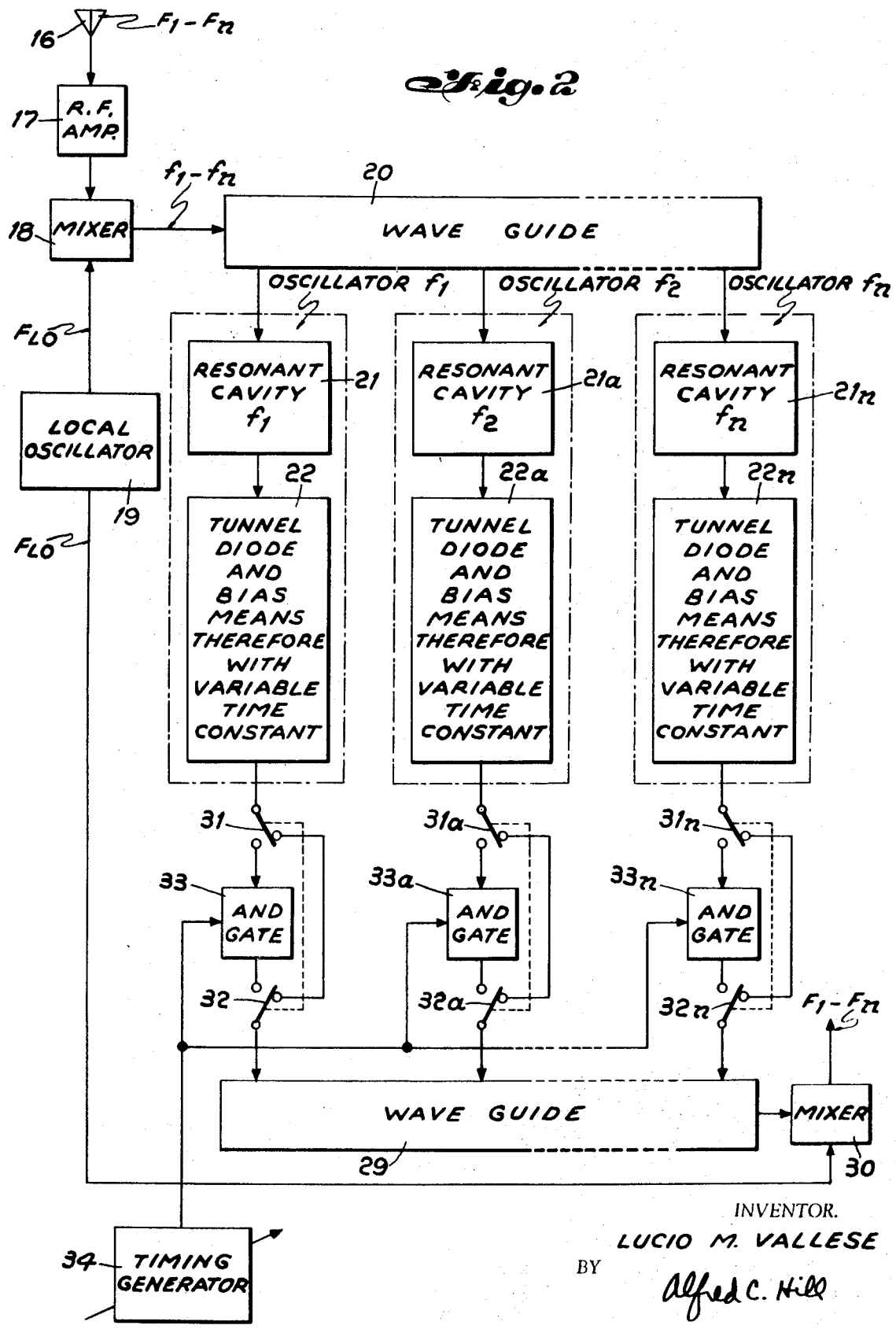
FIG. 2 is a block diagram of a second embodiment of a memory system in accordance with the principles of this invention.

Referring to FIG. 2, the input RF pulse is received by antenna 16 and amplified in amplifier 17 which is down converted as in the case of the embodiment of FIG. 1 by mixer 18 and local oscillator 19. The resultant output of mixer 18 is coupled to input waveguide 20 which again has disposed therealong a plurality of resonant cavities 21 having their resonant frequencies separated by 1 megacycle. An RF pulse having a frequency equal to the resonant frequency of one of the cavities 21 will shock excite this cavity and, thus, the radio frequency pulse is detected. Resonant cavities 21 have disposed therein a tunnel diode which is biased by a bias means having a variable time constant, as illustrated by blocks 22, thereby forming a plurality of oscillators each having a frequency corresponding to the resonant frequency of the associated cavity 21.

Figure 3:
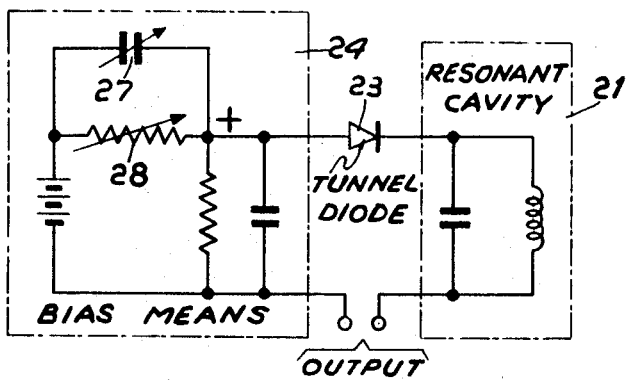
FIG. 3 is an equivalent schematic diagram of an oscillator of FIG. 2.
Figure 4:
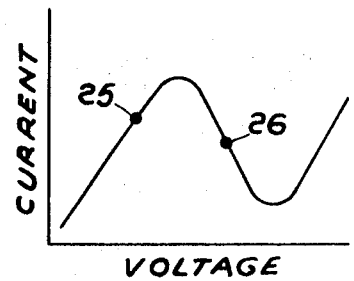
FIG. 4 illustrates the operating characteristic of a tunnel diode useful in explaining the operation of FIG. 3.

Before a resonant cavity 21 is shock excited, tunnel diode 23 is biased by bias means 24, shown in FIG. 3, to be in the positive resistance portion of its characteristic as illustrated at point 25 of FIG. 4. When a resonant cavity 21 is shock excited a sudden increase in the bias voltage occurs, thereby shifting the bias point to the negative resistance region of its characteristic as illustrated at point 26 of FIG. 4 which starts the oscillation of the oscillator. The variable time constant including capacitors 27 and resistor 28 prevents the return of the bias instantaneously to the original condition, thereby maintaining the oscillation of the oscillator for a desired time interval up to 100 milliseconds.

The output of the oscillator is then coupled to the output waveguide 29 and, hence, to mixer 30 which in cooperation with local oscillator 19 up converts this oscillation to the frequency range of the original RF pulses.

Alternatively, the length of time an oscillatory signal is present at the output of the system (the output of mixer 30) can be controlled in conjunction with the variable bias means by moving switches 31 and 32 to their other positions to place an appropriate one of AND gates 33 in coupled relation with the output of an associated one of the oscillators. A variable width timing signal from generator 34 can be used to control the time interval the oscillatory signal is present at the output of the system.

While the have described above the operation of the system of FIG. 2 with the resonant cavity 21 performing the dual function of pulse detecting and resonant circuit of an oscillator, the system of FIG. 2 could incorporate a separate resonant cavity for pulse detection and a separate resonant circuit for the oscillator which is triggered when the associated resonant cavity is shock excited to provide the desired output signal. The length of time the oscillatory signal is present at the output of the system can be controlled as originally described with respect to the illustrated system of FIG. 2.

Figure 5:
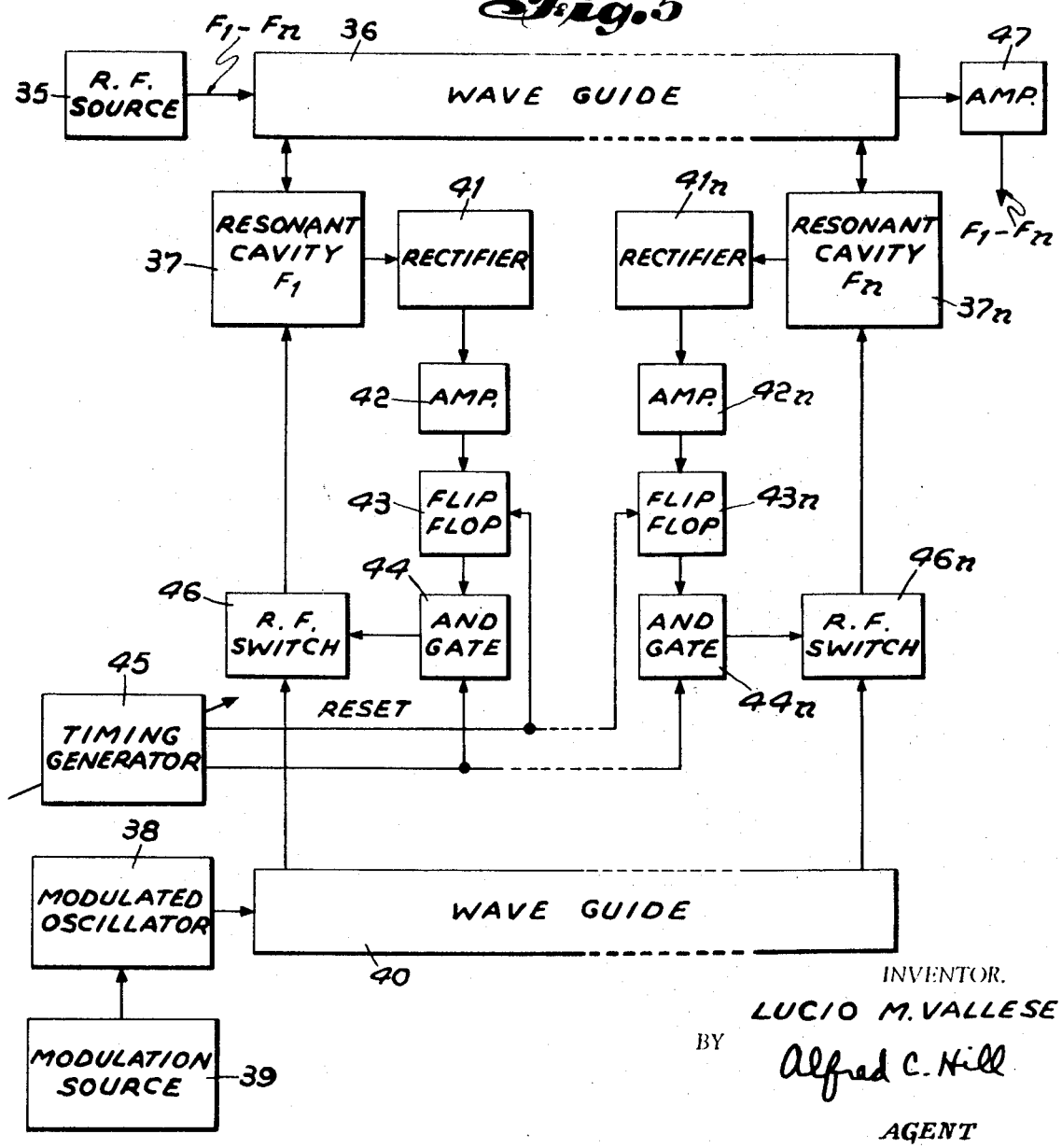
FIG. 5 is a block diagram illustrating a third embodiment of a memory system in accordance with the principle of this invention.

Referring to FIG. 5, the RF pulses from RF source 35 is coupled to an input waveguide 36 which has disposed therealong a plurality of resonant cavities 37 having resonant frequencies spaced one megacycle apart to detect an RF pulse having a frequency corresponding to the resonant frequency of one of the cavities 37.

In this embodiment, the locally generated RF signals are provided by modulating oscillator 38 with a modulating signal from source 39 with a suitable carrier frequency and modulation frequency to provide the desired locally generated RF signals which circulate in waveguide 40 continuously.

When a cavity 37 is shock excited by a radiofrequency pulse having a frequency equal to its resonant frequency, a rectifier 41 produces an output which is amplified in amplifier 42 whose output sets a flip-flop 43 to provide and enable a voltage for the associated one of AND gates 44. A variable width timing signal from timing generator 45 provides the other input for the appropriate one of AND gates 44 to render this AND gate conductive for variable periods of time. When this AND gate 44 is rendered conductive, RF switch 46 is operated to its conductive condition and will permit the RF signals circulating in waveguide 40 to be coupled to the appropriate one of resonant cavities 37 with the appropriate RF signal being selected by this cavity 37 for coupling to waveguide 36 and, hence, to output amplifier 47, such as a traveling wave tube amplifier.

It is obvious that resonant cavities 37 are not a simple cavity providing just an output when shock excited but also must have a port for accepting the radiofrequency signals from switch 46 as well as port to accept the shock exciting radio frequency pulse. Thus, the appropriate number of ports must be provided from cavities 37 and these ports must be appropriately isolated one from the other using known techniques to prevent interaction between signals coming in and signals going out.

While I have described above the principles of my invention in connection with specific apparatus it is to be clearly understood that this description is made only by way of example and not as a limitation to the scope of my invention as set forth in the objects thereof and in the accompanying claims.

I claim:

1. A radiofrequency pulse memory system comprising:
   a source of radiofrequency pulses having their frequency disposed within a given frequency band;
   first means coupled to said source to detect the frequency of each of said pulses;
   second means to generate a plurality of radiofrequency signals each having a different frequency corresponding to one of said detected frequencies; and
   third means coupled to said first means and said second means responsive to said detected frequencies to control the length of time said generated signals having frequencies equal to said detected frequencies are present at the output of said system.

2. A system according to claim 1, wherein
said first means includes
   a waveguide coupled to said source, and
   a plurality of resonant cavities coupled to said waveguide, each of said resonant cavities having a different resonant frequency within said given frequency range.

3. A system according to claim 1, wherein
said second means includes
   a plurality of oscillator means to provide said radiofrequency signals.

4. A system according to claim 1, wherein
said second means includes
   an oscillator means, and
   a source of modulation signal coupled to said oscillator means to modulate the oscillatory signal of said oscillator means to provide said radiofrequency signals.

5. A system according to claim 1, wherein
said source includes
   an input for said radiofrequency pulses,
   a first frequency converter means coupled between said input and said first means, and
   an oscillator means coupled to said first converter means to reduce the frequency of said radiofrequency pulses; and
said second means includes
   a second frequency converter means coupled to said oscillator means to increase the frequency of said radiofrequency signals to the frequency of said radiofrequency pulses at said input.

6. A system according to claim 1, wherein
said first means includes
   a waveguide coupled to said source, and
   a plurality of resonant cavities coupled to said waveguide, each of said resonant cavities having a different resonant frequency within said given frequency band;
said second means includes
   a plurality of normally nonoscillating oscillator means each capable of providing an oscillatory output having a frequency equal to a different one of said resonant frequencies; and
said third means includes a plurality of rectifiers each coupled to a different one of said resonant cavities to provide an output when the associated one of said resonant cavities is shock excited by said radio frequency pulses, and a plurality of variable monostable means each coupled to a different one of said rectifiers and a different one of said oscillator means triggered by an output from the associated one of said rectifiers to render the associated one of said oscillator means oscillatory and to control the length of time said associated one of said oscillator means is oscillatory.

7. A system according to claim 6, wherein said third means further includes a source of variable width timing signals, and a plurality of AND gates each coupled to the output of a different one of said oscillatory means and said source of variable timing signals to cooperate with said monostable means to control the length of time the associated one of said oscillator means is oscillatory.

8. A system according to claim 1, wherein said first means includes a waveguide coupled to said source, and a plurality of resonant cavities coupled to said waveguide, each of said resonant cavities having a different resonant frequency within said given frequency band;

said second means includes a plurality of normally nonoscillatory oscillator means each including a different one of said resonant cavities and providing an oscillatory output having a frequency equal to the resonant frequency of the associated one of said resonant cavities when said associated one of said resonant cavities is shock excited by said radio frequency pulses; and said third means includes a bias means for each of said oscillator means having a variable time constant means therein to control the length of time the associated one of said oscillator means is oscillatory.

9. A system according to claim 8, wherein said third means further includes a source of variable width timing signals, and a plurality of AND gates each coupled to the output of a different one of said oscillatory means and said source of variable timing signals to cooperate with said bias means to control the length of time the associated one of said oscillatory means is oscillatory.

10. A system according to claim 1, wherein said first means includes a first waveguide coupled to said source, and a plurality of resonant cavities coupled to said first waveguide, each of said resonant cavities having a different resonant frequency within said given frequency band;

said second means includes an oscillator means, a source of modulation signal coupled to said oscillator means to modulate the oscillatory signal of said oscillator means to provide said radiofrequency signals, and a second waveguide coupled to the output of said oscillator means in which said radiofrequency signals circulate; and said third means includes a source of variable width timing signals, a plurality of rectifiers each coupled to a different one of said resonant cavities to provide an output when the associated one of said resonant cavities is shock excited by said radiofrequency pulses, a plurality of radiofrequency switches each coupled to a different one of said resonant cavities and said second waveguide, a plurality of AND gates each coupled to a different one of said radiofrequency switches and said source of variable width timing signal, and a plurality of bistable means each coupled to a different one of said AND gates and a different one of said rectifiers triggered by an output from the associated one of said rectifiers to control the conduction of the associated one of said AND gates to render the associated one of said radiofrequency switches conductive to couple the appropriate one of said radio frequency signal through the associated one of said resonant cavities to the output of said first waveguide;

said bistable means and said variable width timing signal cooperating to control the length of time the associated one of said radiofrequency switches is conductive and said appropriate one of said radiofrequency signal is present at said output of said first waveguide.